United States Patent [19]
Protiva et al.

[11] 3,725,409
[45] Apr. 3, 1973

[54] 8-SUBSTITUTED 10-PIPERAZINE-10,11-DIHYDRODIBENZO(B,F) THIEPINES

[75] Inventors: Miroslav Protiva; Karel Pelz; Jirina Metysova, all of Praha, Czechoslovakia

[73] Assignee: Spofa, United Pharmaceutical Works, Praha, Czechoslovakia

[22] Filed: Mar. 23, 1970

[21] Appl. No.: 22,074

[30] Foreign Application Priority Data

Mar. 24, 1969 Czechoslovakia..................2095/69

[52] U.S. Cl...........260/268 TR, 260/327 B, 424/250
[51] Int. Cl................................................C07d 51/70
[58] Field of Search....................260/268 TC, 327 B

[56] References Cited

UNITED STATES PATENTS

| | | |
|---|---|---|
| 3,563,993 | 2/1971 | Schindler et al.................260/268 TR |
| 3,351,599 | 11/1967 | Protiva.............................260/268 TR |
| 3,359,271 | 12/1967 | Schindler.........................260/268 TR |
| 3,379,729 | 4/1968 | Protiva.............................260/268 TR |
| 3,509,154 | 4/1968 | Fouche............................260/268 TR |
| 3,337,554 | 8/1967 | Jilek.................................260/268 TR |
| 3,462,436 | 8/1969 | Fouche............................260/268 TR |

OTHER PUBLICATIONS

Jilek et al. III Cocc. Czech. Chem. Common Vol. 36, p. 2226–2227 (June 1971)

Primary Examiner—Donald G. Daus
Attorney—Michael S. Striker

[57] ABSTRACT

8-substituted 10-piperazino-10,11-dihydrodibenzo (b,f) thiepines having the formula

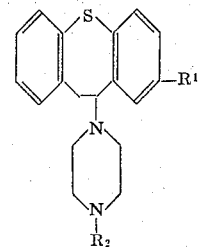

(I)

wherein $R^1$ is alkyl, alkoxy, alkylthio having one to four carbon atoms, or trifluoromethyl, $R^2$ is hydrogen or hydroxyalkyl having two to four carbon atoms, and the pharmaceutically acceptable salts thereof having valuable pharmacodynamic activity and being suitable for use as neuro- and psychotropic medicaments.

3 Claims, No Drawings

8-SUBSTITUTED 10-PIPERAZINE-10,11-DIHYDRODIBENZO(B,F) THIEPINES

This invention relates to a novel series of 8-substituted 10-piperazino-10,11-dihydrodibenzo (b,f) thiepines having valuable therapeutic properties.

The 8-substituted 10-piperazino-10,11-dihydrodibenzo (b,f) thiepines of the invention are characterized by the following formula:

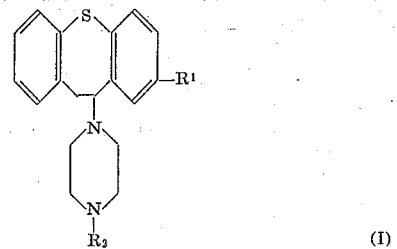

(I)

Included within the scope of the invention are the salts of the bases shown by formula I.

The bases and their salts demonstrate pharmacodynamic activity and are particularly suitable for use as neuro- and psychotropic agents.

The compounds of the invention are also characterized by a very marked central inhibiting activity, high cataleptic activity, antiserotonin-, antihistamine and vasodilating activity.

A typical compound in accordance with the inventions, i.e., 8-methylthio-10-[4-(3-hydroxypropyl)piperazino]-10,11-dihydrodibenzo (b,f) thiepine in the form of its dihydrochloride-dihydrate was evaluated for its pharmalogical activity.

Its acute toxicity was determined in the mouse after intravenous injection. The LD50 thus determined amounted to 44 mg/kg. In the test with the rotating bar, following intravenous administration in the mouse, there were observed already with small dosages, disturbances of coordination of movements; the average dose in this test (ED50) in the period of maximal activity (40 minutes following administration of the test compound) amounted to 0.11 mg/kg; the test compound further acts to potentiate the thiopental narcosis in the mouse following intravenous administration. The threshhold dose, which, statistically significantly, prolongs the thiopental sleep amounts to 0.025 mg/kg. In the catalepsytest carried out in rats, the compound demonstrated high activity; the dose which relieves cataleptic symptoms in 50 percent of the animals following intraperitoneal administration (ED50) amounts to 0.62 mg/kg. In doses of 0.1 mg/kg the instant compound, following introperitoneal administration, produces an antiseritonin activity in the rat in, in-vivo testing. When doses of 10 mg/kg i.p. were used in the mouse, there was no effect on the reserpine response; following oral administration of 50 mg/kg there is barely i.e., a statistically insignificant effect on the ulcerogenic activity of reserpine in the rat. Finally the compound evidenced a marked antihistamine activity in the guinea pig in vivo in the histamine-detoxification test, as well as a marked hypothermic activity, vessel dilating and an inflammation inhibiting effect.

In comparison tests with the known neuroleptic agent "chlorpromazine" the compound of the invention was five times more effective than chlorpromazine in the rotating bar test, 10 times more effective in the test for thiopentalnarcosis potentiation, about 13 times more effective in the catalepsy test and slightly less toxic than the known compound. It's working or therapeutic index is thus much more favorable than that of chlorpromazine.

The compounds of the invention are prepared by reacting an ester of the alcohol having the following formula

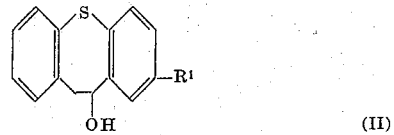

(II)

wherein $R^1$ has the same significance as given in Formula I and advantageously the corresponding halogenide, alkane- or arensulfonate, with a piperazine having the formula

(III)

wherein $R^2$ has the same significance as given in Formula I and whereby the thusly recovered base through neutralization with acid is converted into the corresponding pharmacodynamic salt.

The aforesaid reaction can be carried out to produce the following compounds: 8-methoxy-10-piperazino-10,11-dihydrodibenzo (b,f) thiepine; 8-methylthio-10-piperazino- 10,11-dihydrodibenzo (b,f) thiepine; 8-methoxy-10-[4-(3-hydroxypropyl)-piperazino]-10,11-dihydrodibenzo (b,f) thiepine; 8-methylthio-10-[4-(3-hydroxypropyl)-piperazino]-10,11-dihydrodibenzo (b,f) thiepine, etc.

As starting materials for use in the process of the invention, i.e., as the component having formula II, there may be mentioned 8-methoxy-10-chloro-10,11-dihydrodibenzo (b,f) thiepine; 8-methylthio-10-chloro-10,11-dihydrodibenzo (b,f) thiepine; and 8-trifluoromethyl-10-chloro-10,11-dihydrodibenzo (b,f) thiepine whose preparation has been described by K. Pelz et al., Collection Czechoslov. Chem. Commun. 33, 1895, 1968. As reaction component having formula III i.e., the piperazine component, there may be advantageously used 1-(2-hydroxyethyl)piperazine; 1-(3-hydroxypropyl) piperazine; 1-(4-hydroxybutyl) piperazine; and 1-(3-hydroxybutyl) piperazine.

The substitution reaction can be carried out with or without a solvent, that is, with the excess of piperazine component serving as reaction medium. When a solvent is used it can be benzene, chloroform, acetonenitrile, dimethylformamide and the like. The reaction can be carried out at elevated temperatures and with at the least a 2–5 fold excess of the piperazine component. The isolation of the product has been described in the Examples.

The compounds of the invention can be prepared as the bases which through neutralization with inorganic or organic acids form very easily crystallizable acids. For therapeutic purposes, the corresponding hydrochlorides and maleates have proved particularly advantageous.

The following examples are given for further illustrating the invention, but are in no wise to be construed as limiting the same.

EXAMPLE 1

A solution of 15.0 g 8-methoxy-10-chloro-10,11-dihydrodibenzo (b,f) thiepine and 22.0 g anhydrous piperazine in 30 ml chloroform were heated together for 6 hours under reflux in a boiling water bath. Thereafter the chloroform was evaporated off under reduced pressure and the residue distributed by shaking between 150 ml benzene and 150 ml water. The benzene layer was separated off, washed with 100 ml water and shaken with 100 ml 3NHCl. There, then separated out the solid hydrochloride of the reaction product. After 1 hour of standing, the solid material was separated off with suction, the acid aqueous phase (separated from the filtrate) added and the resultant mixture made alkaline with aqueous ammonia. The separated base was then extracted with benzene, the extract dried with anhydrous potassium carbonate and evaporated. There were thusly recovered 12.1 g 8-methoxy-10-piperazine-10,11-dihydrodibenzo (b,f) thiepine as a crude base. The base was neutralized in an ethanolic solution with 2 equivalents of maleic acid. Following the addition of ether, there separated out of the ethanolic solution the crystalline di(hydrogenmaleate) of the base 8-methoxy-10-piperazine-10,11-dihydrodibenzo (b,f) thiepine which melted at 155–157°C (ethanol-ether).

EXAMPLE 2

The procedure of Example 1 was followed and by reaction of 16.0 g 8-methylthio-10-chloro-10,11-dihydrodibenzo (b,f) thiepine with 22.0 g anhydrous piperazine in 30 ml chloroform, there were obtained 11.8 g of the crude base of 8-methylthio-10-piperazino-10,11-dihydrodibenzo (b,f) thiepine which could be readily crystallized. Following crystallization out of a small volume of acetone, the base melted at 94°–96° C. The corresponding UV-spectrum in methanol showed absorption maxima at 214.5 and 275.5 nm and the IR spectrum (in Nujol) showed characteristic bands at 759, 795, 831, 886 and 1580 cm$^{-1}$.

Following neutralization of the base with maleic acid in ethanol and the addition of ether the corresponding maleate crystallized out. The maleate had a melting point of 162°–163° C (decomposition) (ethanol-ether).

EXAMPLE 3

A mixture of 8.0 g 8-methoxy-10-chloro-10,11-dihydrodibenzo (b,f) thiepine and 5.5 g 1-(3-hydroxypropyl) piperazine was heated for 3 hours in a water bath at a temperature of 120°–125° C. Following cooling, the reaction mixture was diluted with 100 ml water and extracted with benzene. The benzene solution was washed with water and then extracted with 100 ml 3N HCl. The separated hydrochloride was suctioned off, added to the aqueous phase (separated from the filtrate) and made alkaline with an excess of 15 percent sodium hydroxide solution. The freed base was extracted with benzene, the extract dried with anhydrous potassium carbonate and evaporated. The crude base 8-methoxy-10-[4-(3-hydroxypropyl)-piperazino]-0,11-dihydrodibenzo (b, f) thiepine was recovered in a yield of 7.8 g. Following neutralization with maleic acid, the base was crystallized out as the di(hydrogenmaleate) melting at 114°–115° C (ethanol).

EXAMPLE 4

Using a procedure analogous to that of Example 3, 8.0 g 8-methylthio-10-chloro-10,11-dihydrodibenzo (b,f) thiepine were reacted with 11.8 g 1-(3-hydroxypropyl) piperazine at a temperature of 120° C for a reaction period of 6 hours. The isolation procedure described in the foregoing Example was followed and there were recovered 9.9 g of the crystalline base of 8-methylthio-10-[4-(3-hydroxypropyl)-piperazino] - 10,11-dihydrodibenzo (b,f) thiepine having a melting point of 93°–95° C (benzene-petroleum ether). Following neutralization with HCl in ethanolic solution the corresponding crystalline dihydrochloride, as the dihydrate separated out. The compound had a melting point of 223°–226° C (water-ethanol-ether).

What is claimed as new and desired to be protected by Letters Patent is set forth in the appended

1. A compound selected from the group consisting of 8-methoxy-10-4-(3-hydroxypropyl)piperazino]-10,11--dihydrodibenzo(b,f) thiepine and 8-methylthio-10-[4-(hydroxypropyl)piperazino]-10,11-dihydrodibenzo(b,f) thiepine.

2. The compound according to claim 1 designated 8-methoxy-10-[4-(3-hydroxypropyl)piperazino]-10,11-dihydrodibenzo(b,f)thiepine.

3. The compound according to claim 1 designated 8-methylthio-10[4-(3-hydroxypropyl)piperazino]-10,11-dihydrodibenzo(b,f)thiepine.

* * * * *